United States Patent
Shimizu

(10) Patent No.: US 7,359,100 B2
(45) Date of Patent: Apr. 15, 2008

(54) IMAGE CORRECTION METHOD, PROGRAM, AND APPARATUS

(75) Inventor: Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/372,389

(22) Filed: Mar. 10, 2006

(65) Prior Publication Data
US 2006/0170998 A1 Aug. 3, 2006

Related U.S. Application Data

(63) Continuation of application No. PCT/JP03/15899, filed on Dec. 11, 2003.

(51) Int. Cl.
G03F 3/00 (2006.01)
G03F 3/10 (2006.01)

(52) U.S. Cl. .............. 358/518; 358/520; 358/521; 358/522; 358/523; 382/162; 382/163; 382/167; 382/168; 382/172

(58) Field of Classification Search ........ 358/518, 358/522, 520, 521, 523; 382/162–172
See application file for complete search history.

(56) References Cited

U.S. PATENT DOCUMENTS

| | | | | | |
|---|---|---|---|---|---|
| 5,181,105 | A | * | 1/1993 | Udagawa et al. | 358/520 |
| 5,331,442 | A | * | 7/1994 | Sorimachi | 358/532 |
| 5,539,523 | A | | 7/1996 | Nakai et al. | |
| 5,619,347 | A | | 4/1997 | Taniguchi et al. | |
| 5,721,628 | A | * | 2/1998 | Takaragi et al. | 358/518 |
| 5,973,804 | A | * | 10/1999 | Yamada | 358/538 |
| 6,151,405 | A | * | 11/2000 | Douglass et al. | 382/133 |
| 6,240,203 | B1 | * | 5/2001 | Kawano et al. | 382/164 |
| 6,608,926 | B1 | * | 8/2003 | Suwa et al. | 382/162 |
| 6,873,441 | B1 | * | 3/2005 | Kuwabara et al. | 358/3.26 |
| 6,965,695 | B2 | * | 11/2005 | Yamakawa | 382/199 |
| 7,009,735 | B2 | * | 3/2006 | Ebner | 358/1.9 |
| 7,013,025 | B2 | * | 3/2006 | Hiramatsu | 382/103 |
| 7,072,084 | B2 | * | 7/2006 | Shirasawa | 358/525 |
| 7,248,743 | B2 | * | 7/2007 | Murakami | 382/251 |
| 2003/0031345 | A1 | * | 2/2003 | Farmer | 382/103 |
| 2003/0053689 | A1 | * | 3/2003 | Watanabe et al. | 382/167 |
| 2003/0090750 | A1 | * | 5/2003 | Takahashi | 358/516 |

(Continued)

FOREIGN PATENT DOCUMENTS

JP 11-041474 2/1999

(Continued)

Primary Examiner—Aung S. Moe
Assistant Examiner—Beniyam Menberu
(74) Attorney, Agent, or Firm—Staas & Halsey LLP

(57) ABSTRACT

An image correction method of this invention includes a step of identifying a first pixel that satisfies one of predetermined conditions as to a pixel level, which are set for each color component, among pixels included in a specific image; a step of identifying a second pixel that satisfies the plural aforementioned predetermined conditions as to the pixel level, which are set for each color component, among pixels included in the specific image; a step of calculating an evaluation value relating to a duplication degree of the first pixel and the second pixel; and a correction step of correcting the specific image based on the evaluation value. As a result, it becomes possible to avoid a wrong correction for an object having the chromatic color, and an appropriate image correction is carried out.

13 Claims, 7 Drawing Sheets

U.S. PATENT DOCUMENTS

2004/0228542 A1* 11/2004 Zhang et al. ............... 382/275
2005/0232481 A1* 10/2005 Wu ............................ 382/167

FOREIGN PATENT DOCUMENTS

| JP | 2000-165906 | 6/2000 | |
| JP | 2001-245311 | * | 9/2001 |
| JP | 2003-309732 | * | 10/2003 |

* cited by examiner

IMAGE CORRECTION METHOD, PROGRAM, AND APPARATUS

CROSS-REFERENCE TO RELATED APPLICATIONS

This application is a continuing application, filed under 35 U.S.C. section 111(a), of International Application PCT/JP2003/015899, filed Dec. 11, 2003.

TECHNICAL FIELD OF THE INVENTION

This invention relates to an image correction technique.

BACKGROUND OF THE INVENTION

Recently, an opportunity to handle a color image as digital data has increased by the spread of image-related equipments such as digital cameras and color printers, and the improvement of the computer's performance. However, an image quality of a color image taken by a digital camera or the like does not always satisfy the user. For example, an illumination light might badly affect the color balance. In such a case, an originally white object is faintly colored by other colors. Therefore, in order to obtain an image that satisfies the user, a technique to correct the color balance (especially, white balance) is desired. However, it is difficult to correct the color balance in a case where there are a lot of pixels with chromatic colors in the image, or the like.

For example, JP-A-2000-165906 (Patent Document 1) discloses a technique to correct the white balance by avoiding the influence of portions having the chromatic colors in the image. That is, the luminance information and the chroma information are extracted from color image data read from an image memory, a region recognized as a white and recognized as preset colors near white in all pixels of the color image data is determined, and the coefficient for the image processing is calculated based on the mean value of each color component in the region and is outputted. Then, an image processor receives the coefficient for the image processing and a processing flag as inputs, and automatically carries out a white balance correction processing for the image data read from the image memory based on these inputs.

However, according to the aforementioned technique, there is a possibility that the correction from a light color to a white color is wrongly judged and such a wrong correction is carried out, when there is originally no white portion, but there is, for example, a light color portion in the original image. It will be explained specifically by using image examples of FIGS. 8A and 8B. FIGS. 8A and 8B show image examples in a case where, for example, a plant was photographed by a digital camera or the like.

The example of FIG. 8A includes a brown region 10, a light purple region 11, and a green region 12. On the other hand, the example of FIG. 8B includes a brown region 20, a white region 21, and a green region 22. That is, flower colors are different between FIGS. 8A and 8B, and there is no white portion in the example of FIG. 8A. In such a case, when correcting the image of FIG. 8A by using the aforementioned background art, the light purple region 11 is normally identified as an correction target and is corrected to the white color. Thus, it is corrected to the image as shown in FIG. 8B. When the light purple region 11 was an originally white flower region and became light purple by receiving the influence of, for example, an illumination light, a proper correction was carried out. Meanwhile, when the light purple region 11 was an originally light purple flower region and the correction was essentially unnecessary, an improper correction was carried out. Therefore, in such a case, it is not appropriate to automatically carry out the correction according to the judgment that it is a light color near white.

Thus, according to the aforementioned background art, there was a possibility that the wrong correction is carried out for the image having no white region originally.

SUMMARY OF THE INVENTION

Therefore, an object of this invention is to provide a new technique to appropriately correct the color balance of an image.

An image correction method according to this invention includes: a first pixel identifying step of identifying first pixels that satisfy one of predetermined conditions as to a pixel level, which are set for each color component, among pixels included in a specific image; a second pixel identifying step of identifying second pixels that satisfy the plural predetermined conditions as to the pixel level, which are set for each color component, among the pixels included in the specific image; a step of calculating an evaluation value relating to a duplication degree of the first pixels and the second pixels; and a correcting step of correcting the specific image based on the evaluation value.

It is necessary to evaluate the pixel level construction for each color component in each pixel for the entire image to avoid a wrong correction for an object having the chromatic color. This invention avoids the wrong correction for an object having the chromatic color by evaluating the duplication degree of the first pixels (a group of the first pixels in the specific image) and the second pixels (a group of the second pixels in the specific image) and carrying out the correction based on the aforementioned evaluation value that is the evaluation result, as described above. Therefore, it becomes possible to carry out an appropriate image correction. Incidentally, in a case where not only the white color balance but also the black color balance are adjusted, a similar processing may be carried out.

Moreover, the aforementioned correction step may include a correction amount calculating step of calculating a correction amount based on the aforementioned evaluation value. Because the aforementioned evaluation value is thought as a value reflecting the possibility to include an object having the chromatic color (or, oppositely, the possibility to include an originally white (or black) object), when the correction amount is adjusted according to the evaluation value, an appropriate correction will be carried out.

Moreover, this invention may further include a step of generating histogram data of the pixel level for each color component for the specific image; and a step of identifying a first pixel level that cumulative frequency from the highest pixel level becomes a predetermined ratio (a first ratio) for the number of pixels to be processed in the specific image, for each color component, by using the histogram data. And, the aforementioned predetermined condition may be a condition that the pixel in the specific image has one of the pixel levels included between the identified first pixel level and a limit level of the color component.

The limit level means the maximum value or the minimum value of the pixel level, and when the color component is represented by, for example, RGB, the highlight is at the maximum value side. Thus, it becomes possible to evaluate an image more appropriately by setting the aforementioned predetermined condition based on the frequency distribution of the pixel levels for each color component. That is, it becomes possible to identify the first pixels and the second pixels, taking into account the bias of the frequency distribution of the pixel levels for each color component.

Moreover, this invention may further include: a step of generating histogram data of the pixel levels for each color component in the specific image; and a step of identifying a second pixel level that the cumulative frequency from the highest pixel level becomes a predetermined ratio (a second ratio) for the number of pixels to be processed in the specific image, for each color component, by using the histogram data. And, the aforementioned correction amount calculating step may include a step of calculating a tentative correction amount for each color component based on a difference between the second pixel level and the limit level of the color component; and a step of changing the tentative correction amount based on the evaluation value.

Thus, the tentative correction amount adapted to the specific image is calculated by calculating the tentative correction amount of each color component based on the frequency distribution of the pixel levels for each color component. Furthermore, because the tentative correction amount is adjusted based on the evaluation value, it becomes possible to carry out an appropriate image correction adapted to the specific image.

Moreover, the aforementioned correction amount calculating step may include a step of setting a third ratio based on the aforementioned evaluation value; a step of generating histogram data of the pixel levels for each color component for the specific image; a step of identifying a third pixel level that the cumulative frequency from the highest pixel level becomes the aforementioned third ratio for the number of pixels to be processed in the specific image, for each color component, by using the histogram data; and a step of determining the correction amount based on a difference between the aforementioned third pixel level and the limit level of the color component. By setting a threshold in the frequency distribution (the aforementioned third ratio) according to the evaluation value, it becomes possible to achieve an effect similar to a technique to adjust by using the evaluation value after the tentative correction amount is calculated.

Moreover, the aforementioned correction step may include: a step of identifying a calculation method of a reference correction amount according to the aforementioned evaluation value; a step of calculating the reference correction amount according to the identified calculation method; and a step of correcting the specific image by using the reference correction amount. By changing the calculation method of the reference correction amount according to the evaluation value, an appropriate correction amount is calculated in accordance with the possibility of the inclusion of an object having the chromatic color.

Moreover, this invention may further include a step of identifying a pixel whose pixel level of one color component is the limit level among pixels included in the specific image. And, in the first pixel identifying step and the second pixel identifying step, the processing may be carried out for pixels other than the pixel whose pixel level of one color component is the limit level. There is a possibility that the pixel whose pixel level of one of the color components is the limit level is a pixel that has exceeded the predefined limit level of the pixel levels by, for example, the influence of a backlight or the like. By excluding such a pixel from the processing targets, it becomes possible to carry out judgement for pixels that maintain an original construction of the pixel levels for each color component. Thus, appropriate first pixels and second pixels can be identified.

Moreover, in the aforementioned second pixel identifying step, second pixels that satisfy all of the aforementioned predetermined conditions as to the pixel level, which are set for each color component, may be identified among the pixels included in the specific image. That is, the pixels whose pixel levels of all color components are high (or low) are identified, and the pixels that are thought as being originally white (or black) more are identified.

Moreover, this invention may further include: a step of generating histogram data of the pixel levels for each color component; a step of identifying a fourth pixel level that cumulative frequency from the limit level of the color component becomes a predetermined ratio for the number of second pixels to be processed in the specific image, for each color component, by using the histogram data. And, the aforementioned correction amount calculating step may include: a step of calculating a tentative correction amount for each color component based on a difference between the fourth pixel level and the limit level of the color component; and a step of changing the tentative correction amount based on the aforementioned evaluation value.

Thus, when generating the histogram for the second pixel, the influence of the pixel thought to have the chromatic color is excluded in the determination of the fourth pixel level. Therefore, it becomes difficult to receive the influence of an object having the chromatic color in the correction amount calculation.

Incidentally, it is also possible that a ratio of the number of first pixels and the number of second pixels is adopted as the aforementioned evaluation value.

Incidentally, it is also possible to create a program to make a computer carry out the method according to this invention, and this program is stored in a storage medium or a storage device such as a flexible disk, a CD-ROM, a magnet-optical disk, a semiconductor memory, and a hard disk. Further, the program may be distributed as a digital signal through a network. Incidentally, intermediate processing results are temporarily stored in a storage device such as a memory.

DETAILED DESCRIPTION OF THE PREFERRED EMBODIMENTS

Figure 1A:
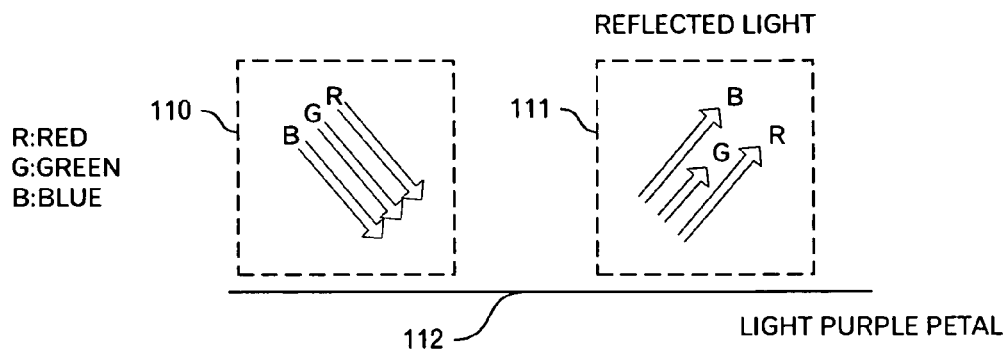
FIG. 1A is a conceptual diagram to explain color components of a first case.

First, a principle of this invention will be explained with color component conceptual diagrams shown in FIGS. 1A to 1C. FIG. 1A shows incident light 110, reflected light 111, and a plane 112. Each color component of red (R), green (G), and blue (B), which are three primary colors of the light, is included in the incident light 110, for example. The light normally has a continuous spectrum distribution for the wavelength. However, three components are schematically represented, here. An arrow length in the diagram represents the intensity of each color component and corresponds to a value of an image photographed by a digital camera in which the white balance is appropriately adjusted, for example. It is shown that all color components of the incident light 110 have the same intensity and achromatic color light is irradiated to the plane 112. Here, the plane 112 is light purple, and the achromatic color light is irradiated to the plane 112. Then, mainly red light and blue light are reflected as understood from the reflected light 111 that represents a state where red and blue arrows are longer than a green arrow. A person who receives the reflected light 111 sees the plane 112 as being light purple, because it becomes purple when red and blue are mixed.

Figure 1B:
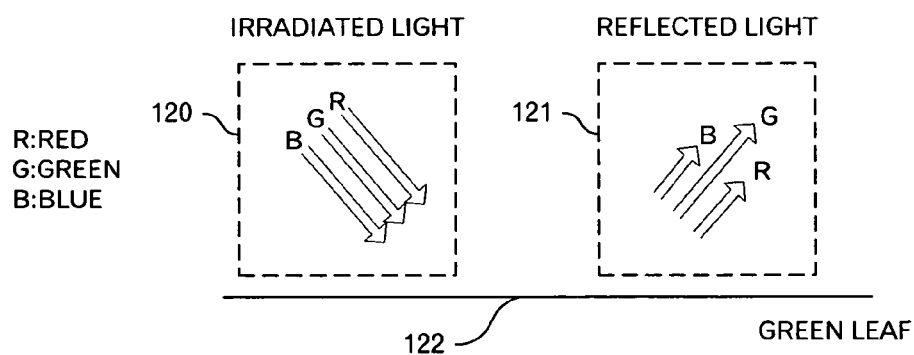
FIG. 1B is a conceptual diagram to explain color components of a second case.

FIG. 1B shows incident light 120, reflected light 121, and a plane 122. The incident light 120 is achromatic color light similar to the incident light 110 in FIG. 1A. Here, the plane 122 is green, and an achromatic color light is irradiated to the plane 122. Then, mainly green light is reflected as understood from the reflected light 121 that represents a state in which red and blue arrows are shorter than a green arrow. A person who receives the reflected light 121 sees the plane 122 as being green.

Figure 1C:
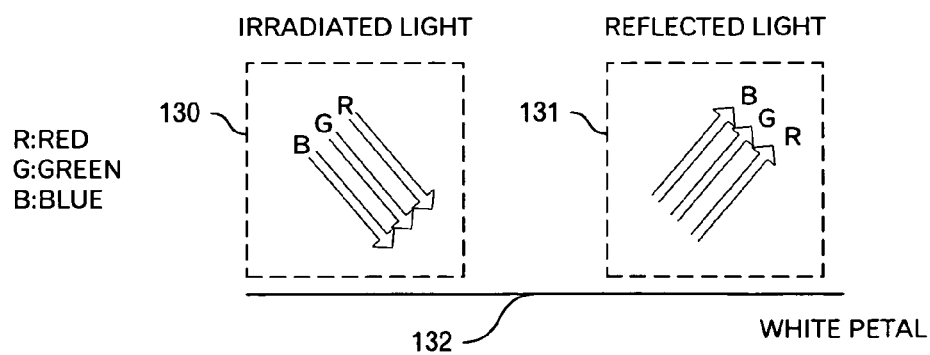
FIG. 1C is a conceptual diagram to explain color components of a third case.

FIG. 1C shows incident light 130, reflected light 131, and a plane 132. The incident light 130 is achromatic color light similar to the incident light 110 in FIG. 1A and the incident light 120 in FIG. 1B. Here, the plane 132 is white, and achromatic color light is irradiated to the plane 132. Then, the light of all colors is reflected as understood from the reflected light 131 that represents a state in which the length of red, green and blue arrows are equal. A person who receives the reflected light 131 sees the plane 132 as being white.

Figure 8A:
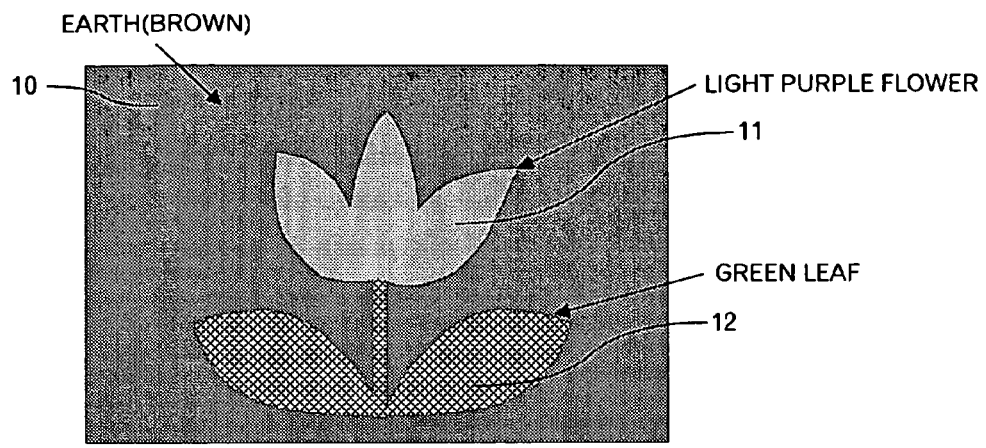
FIG. 8A is a first image example.

From the aforementioned matter, for example, an original object of the light purple region 11 of the image example in FIG. 8A reflects the light as shown in FIG. 1A, and an original object of the green region 12 reflects the light as shown in FIG. 1B. That is, many of pixels included in the light purple region 11 have higher pixel levels for R (red) and B (blue) components among RGB color components than pixels included in other regions of the image, and many of pixels included in the green region 12 have higher pixel levels for a G (green) component among the RGB color components than pixels included in other regions of the image. Although the explanation about the brown region 10 is omitted, the color component whose pixel level is high is biased similar to the light purple region 11 and the green region 12. Thus, there is no region including a lot of pixels that have high pixel levels for all color components in the image having no white region.

Figure 8B:
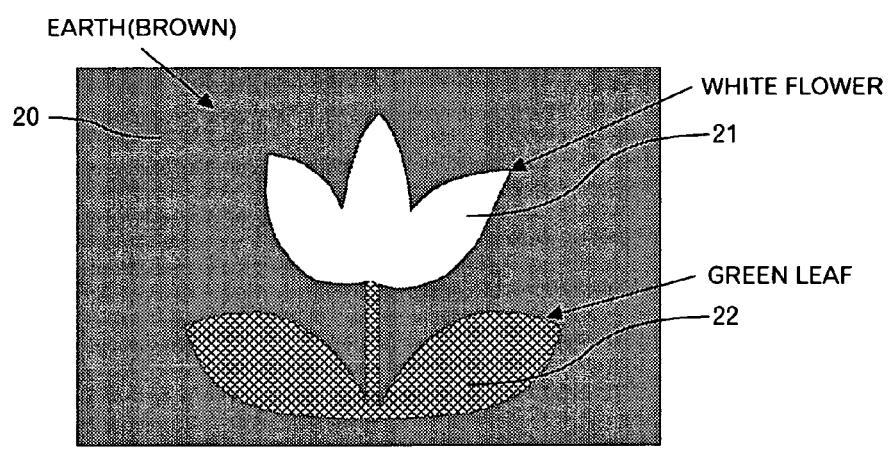
FIG. 8B is a second image example.

On the other hand, for example, an original object of the white region 21 of the image example in FIG. 8B reflects the light as shown in FIG. 1C. That is, many of pixels included in the white region 21 have higher pixel levels for R (red), G (green) and B (blue), namely all color components, among RGB color components than pixels included in other regions of the image.

States of the light (reflected light) that a plane having each color reflects against the incident light having the achromatic color are as described above. That is, the light purple plane 112 in FIG. 1A reflects with much attenuation of the green component, the green plane 122 in FIG. 1B reflects with much attenuation of the red and blue components, and the white plane 132 in FIG. 1C reflects almost all color components as they are.

A case will be considered where, for example, light purple light such as the reflected light 111 in FIG. 1A showing a state that the red and blue arrows are longer than the green arrow is irradiated as an incident light. First, when the light such as the reflected light 111 is irradiated to the plane 112 in FIG. 1A as the incident light, light whose green component is less is reflected as compared with the irradiation of the incident light 110 having the achromatic color. That is, the light in a state where only the green arrow of the reflected light 111 is further shortened is reflected. In addition, when the light such as the reflected light 111 is irradiated to the plane 122 in FIG. 1B as the incident light, light whose green component is less is reflected as compared with the irradiation of the incident light 120 having the achromatic color. That is, the green arrow of the reflected light 121 is shortened, and the light in a state where the green arrow length is similar to that of the red and blue arrows is reflected.

Moreover, when the light such as the reflected light 111 is irradiated as the incident light, the light similar to the reflected light 111 is reflect, because the plane 132 in FIG. 1C reflects the incident light as it is. That is, because the light similar to the reflected light in a case where the incident light 110 of the achromatic color is irradiated to the light purple plane 112 in FIG. 1A is irradiated, a person who receives such the reflected light sees the plane 132 in FIG. 1C as being light purple.

For example, when the aforementioned light purple light is irradiated to the original object of the image shown in FIG. 8A, the reflected light becomes light purple overall. However, many of pixels included in the light purple region 11 have higher pixel levels for the R (red) and B (blue) components among the RGB color components than pixels included in other region of the image as well as when the achromatic color light is irradiated. In addition, also with respect to the green region 12, many of pixels included in the green region 12 also have higher pixel levels for the G (green) component among the RGB color components than pixels included in other region of the image. Although the pixel level of the G (green) component of the pixels included in the green region 12 is lower than a case where the achromatic color light is irradiated, the pixel level of the G (green) component of the pixels included in the green region 12 is still higher than the pixels included in other region of the image, because the pixel level of the G (green) component is lowered in the entire image.

Thus, in an image without any white region, there is no region including a lot of pixels that have high pixel levels for all color components even if the light that is not the achromatic color light is irradiated to an original object of the image.

On the other hand, for example, when the aforementioned light purple light is irradiated to an original object of the image shown in FIG. 8B, the reflected light becomes light purple overall. However, many of pixels included in the white region 21, which seems to see like light purple, have higher pixel levels for the R (red), G (green) and B (blue) components, namely for all color components, among the RGB color components, than pixels included in other region of the image as well as when the achromatic color light is irradiated. Although the pixel level of the G (green) component of the pixels included in the white region 21 is lower than that when the achromatic color light is irradiated, the level of all color components of the pixels included in the white region 21 is still higher than that of pixels included in other region of the image, because the pixel level of the G (green) component is lowered in the entire image.

Thus, even if the light that is not the achromatic color light is irradiated, an original object of the white region includes a lot of pixels that have relatively high pixel levels for all color components. That is, even if the entire image is discolored in a specific color direction, the originally white pixel has the relatively high pixel level for all color components in the image.

Therefore, it is possible to prevent pixels in a region that may not originally be a white region from being corrected to the white by analyzing frequency distribution of the pixel levels for each RGB and construction (or balance) of the pixel levels for each color component in each pixel in the image to be processed.

Figure 2:
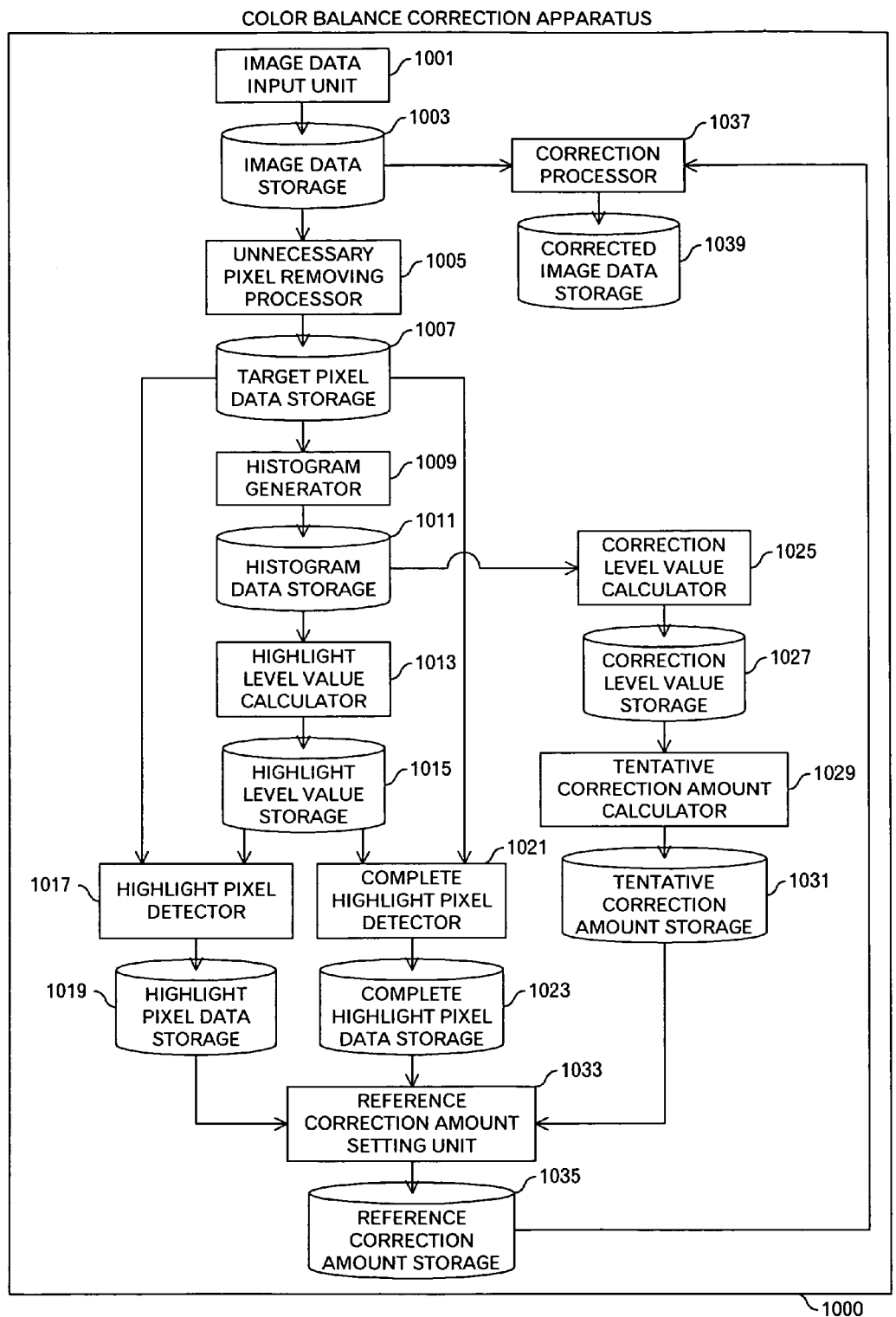
FIG. 2 is a functional block diagram of a color balance correction apparatus according to an embodiment of this invention.

FIG. 2 shows a functional block diagram of a color balance correction apparatus according to an embodiment of this invention. A color balance correction apparatus 1000 includes an image data input unit 1001, an image data storage 1003, an unnecessary pixel removing processor 1005, a target pixel data storage 1007, a histogram generator 1009, a histogram data storage 1011, a highlight level value calculator 1013, a highlight level value storage 1015, a highlight pixel detector 1017, a highlight pixel data storage 1019, a complete highlight pixel detector 1021, a complete highlight pixel data storage 1023, a correction level value calculator 1025, a correction level value storage 1027, a tentative correction amount calculator 1029, a tentative correction amount storage 1031, a reference correction amount setting unit 1033, a reference correction amount storage 1035, a correction processor 1037 and a corrected image data storage 1039.

The details of these processing contents will be described in the following explanation of a processing flow. Here, the cooperation relationship among respective functional blocks will be explained mainly and simply.

The image data input unit 1001 is an interface with external devices such as scanners and digital cameras, or the like, and stores image data into the image data storage 1003 when it reads or receives the image data. The unnecessary pixel removing processor 1005 reads out the image data from the image data storage 1003, and stores the pixel data whose gradation level is judged not to be overflowed into the target pixel data storage 1007.

The histogram generator 1009 generates histogram data for each color component based on the pixel data stored in the target pixel data storage 1007, and stores the histogram data into the histogram data storage 1011. The highlight level value calculator 1013 calculates a highlight level value for each color component based on the data stored in the histogram data storage 1011, and stores the highlight level value into the highlight level value storage 1015. The highlight level value is a threshold to judge whether the pixel level is high or not.

The highlight pixel detector 1017 stores the number of pixels whose pixel level of one of the color components is judged to be high into the highlight pixel data storage 1019, referring to the highlight level value storage 1015 and the target pixel data storage 1007. The complete highlight pixel detector 1021 stores the number of pixels whose pixel levels of color components are judged to be high into the complete highlight pixel data storage 1023, referring to the highlight level value storage 1015 and the target pixel data storage 1007.

The correction level value calculator 1025 calculates a correction level value for each color component based on the data stored in the histogram data storage 1011, and stores the correction level value into the correction level value storage 1027. The correction level value is a threshold of the pixel level and it is used to calculate the tentative correction amount described later. The tentative correction amount calculator 1029 calculates a tentative correction amount, referring to the correction level value storage 1027, and stores the tentative correction amount into the tentative correction amount storage 1031. The tentative correction amount is a temporarily determined correction amount to calculate the reference correction amount described later. The reference correction amount setting unit 1033 calculates a reference correction amount, referring to the highlight pixel data storage 1019, the complete highlight pixel data storage 1023 and the tentative correction amount storage 1031, and stores the reference correction amount into the reference correction amount storage 1035. The reference correction amount is a reference correction amount in a correction processing described later.

The correction processor 1037 carries out a correction processing based on the reference correction amount stored in the reference correction amount storage 1035 for the image data read out from the image data storage 1003, and stores the corrected image data into the corrected image data storage 1039. Incidentally, pixel data stored in the target pixel data storage 1007 may be used as a correction target.

The processing contents of the color balance correction apparatus 1000 shown in FIG. 2 will be explained hereinafter by using FIGS. 3 to 7. In this embodiment, for example, a processing example to correct the white color balance in which the pixel levels of all color components of the RGB are high will be shown. Incidentally, it is possible to correct the black color balance, for example, in which the pixel levels of all color components of the RGB are low.

Figure 3:
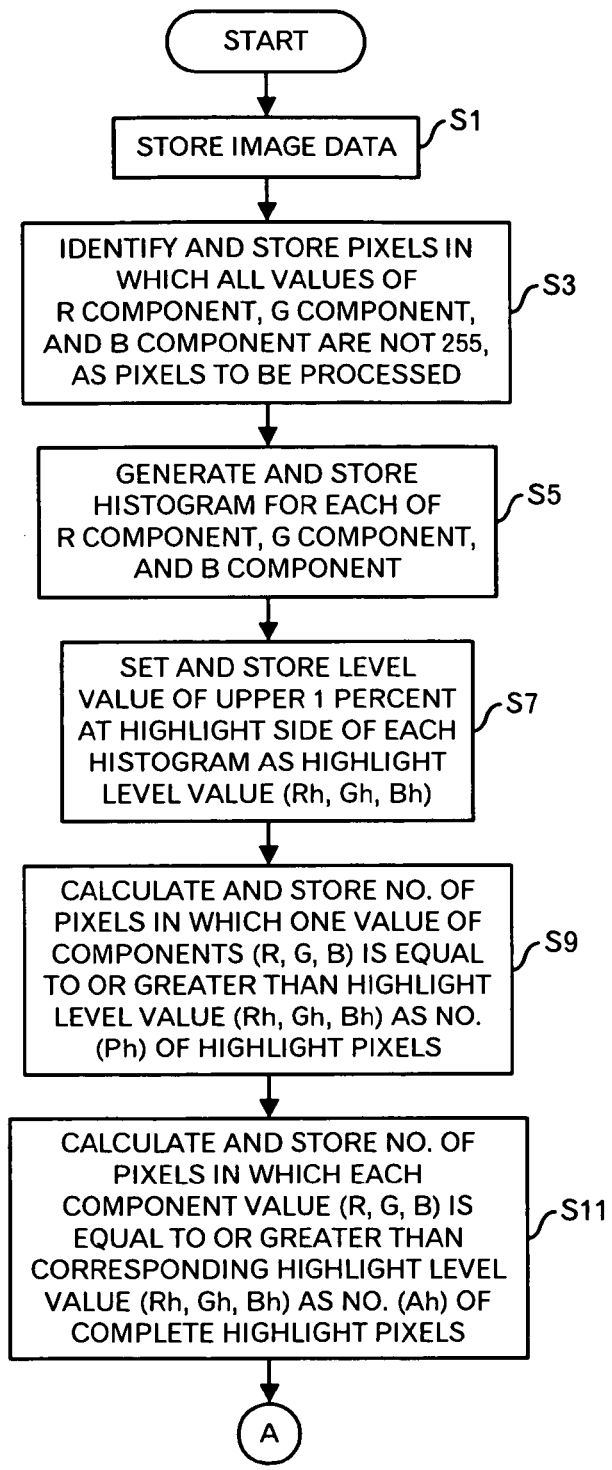
FIG. 3 is a diagram showing a first half part of a processing flow according to the embodiment of this invention.

First of all, the image data input unit 1001 that is the interface with the external devices such as scanners and digital cameras reads or receives image data, and stores the image data into the image data storage 1003 (FIG. 3: step S1). Incidentally, it is assumed that this image data is represented by RGB of 256 gradation levels, for example.

The unnecessary pixel removing processor 1005 identifies pixels whose any color component value of the R component, the G component and the B component is not 255 from the image data stored in the image data storage 1003, and stores identified pixels into the target pixel data storage 1007 (step S3). The value of 255 is the limit value in the 256 gradation levels. Here, as for the pixels having such a value, it is judged that the gradation overflow is caused by the influence of backlight or the like, and the pixels are excluded from the processing target. Incidentally, this processing is optional.

Then, the histogram generator 1009 generates histogram data for each color component of the R component, the G component, and the B component based on the pixel data stored in the target pixel data storage 1007, and stores the histogram data into the histogram data storage 1011 (step S5).

Then, the highlight level value calculator 1013 calculates a level value corresponding to upper one percent, for example, at the highlight side (that is, the side where the pixel level is higher) of each histogram based on the data stored in the histogram data storage 1011, and stores the level values into the highlight level value storage 1015 as a highlight level value (Rh, Gh, Bh) (step S7).

Figure 4:
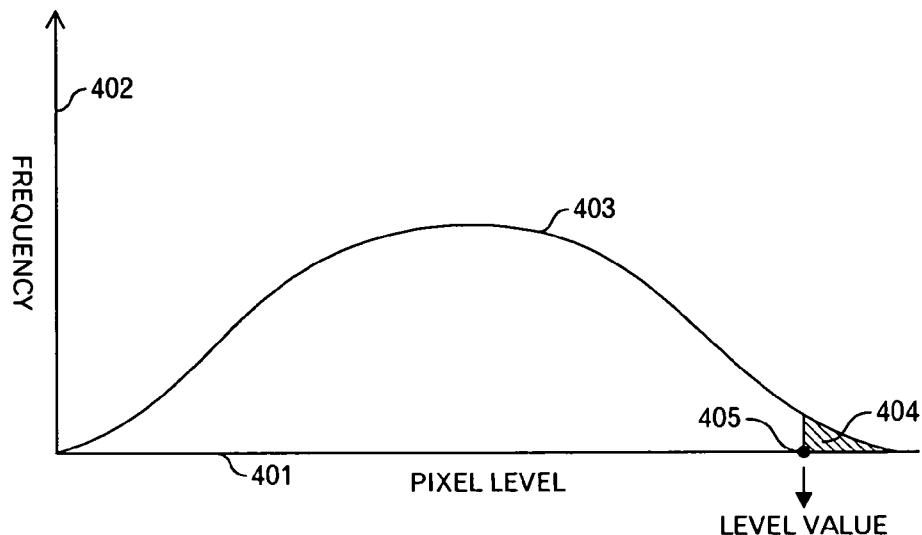
FIG. 4 is a conceptual diagram to explain a level value setting of the first case.

FIG. 4 shows a conceptual diagram of a level value setting. FIG. 4 shows an axis 401 corresponding to the pixel level, an axis 402 corresponding to the frequency, a frequency curve 403, a reference level region 404, and a point 405 to indicate the set level value. Incidentally, the pixel level value grows from left to right of the diagram, for example. Moreover, the frequency curve 403 is generated based on the frequency for each pixel level from 0 to 255, for example. The pixel level is discrete, but, it is shown by the curve, here.

First, the highlight level value calculator 1013 calculates, for example, the number of pixels corresponding to one percent, for example, of the number of all pixels to be processed. When the number of all pixels to be processed is five hundred thousands, the number of pixels corresponding to one percent is five thousands. Then, it identifies the pixel level whose cumulative frequency from the highest level reaches to five thousands, for example. When the frequency curve 403 is a curve, it identifies the pixel level at which the area of the reference level region 404 becomes five thousands. In the example of FIG. 4, the pixel level positioned at the point 405 is identified as the highlight level value. Such a processing is carried out for each color component (R, G, B).

Returning to the explanation of FIG. 3, the highlight pixel detector 1017 refers to the highlight level value storage 1015 and the target pixel data storage 1007 to store the number of pixels whose pixel level for at least one color component of the R component, the G component, and the B component is higher than the highlight level value into the highlight pixel data storage 1019 as the number (Ph) of highlight pixels (step S9). Then, the complete highlight pixel detector 1021 refers to the highlight level value storage 1015 and the target pixel data storage 1007 to store the number of pixels whose pixel level for all color components of the R component, the G component, and the B component are higher than the highlight level value into the complete highlight pixel data storage 1023 as the number (Ah) of complete highlight pixels (step S11). Then, the processing shifts to a processing of FIG. 5 through a terminal A.

Figure 5:
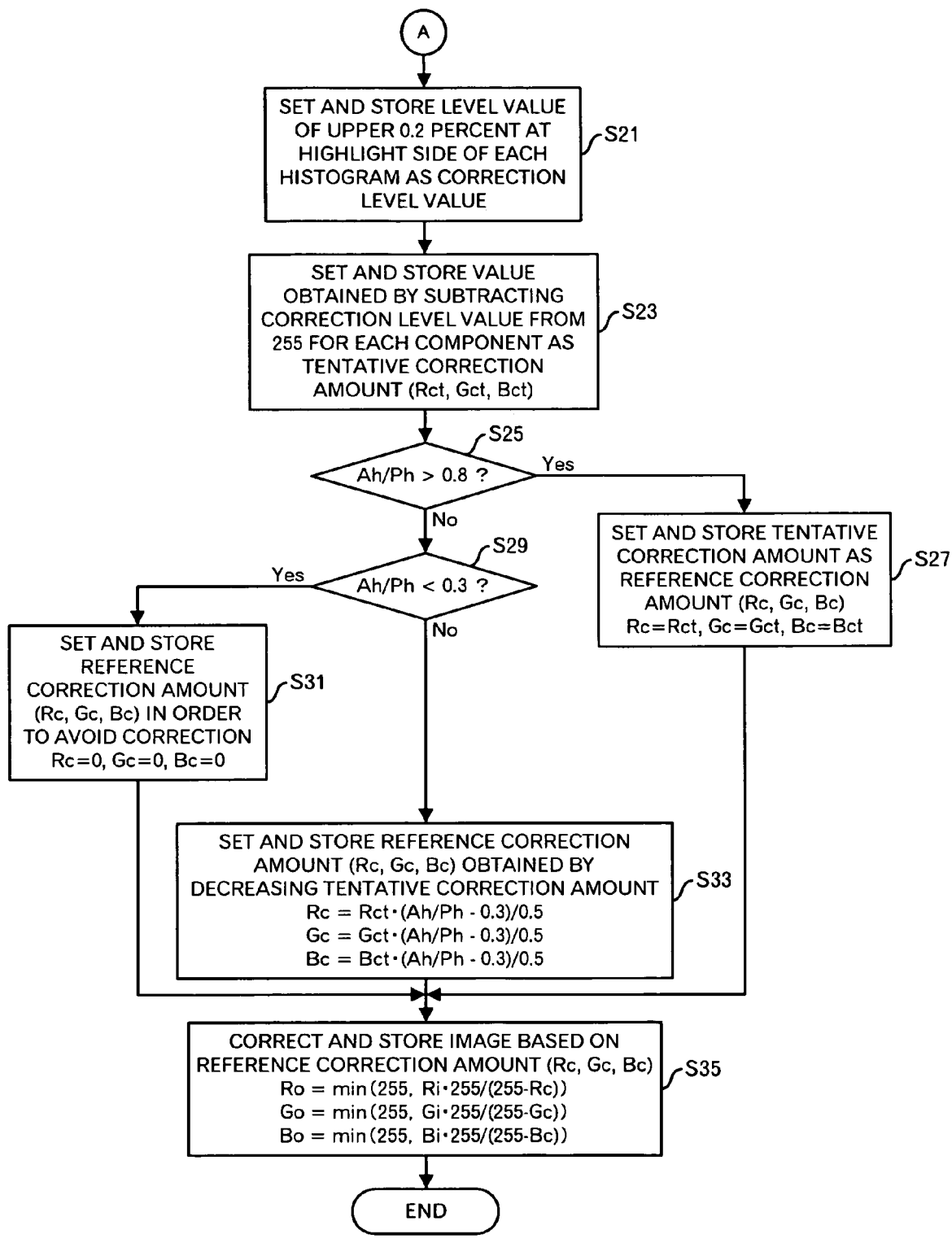
FIG. 5 is a diagram showing a second half part of the processing flow according to the embodiment of this invention.

Then, the correction level value calculator 1025 calculates, for example, upper 0.2 percent level value at the highlight side (that is, the side where the pixel level is higher) of each histogram based on the data stored in the histogram data storage 1011, and stores the upper 0.2 percent level value into the correction level value storage 1027 as a correction level value (FIG. 5: step S21). The calculation method of the correction level value is similar to the aforementioned calculation method of the highlight level value (refer to FIG. 4).

Then, the tentative correction amount calculator 1029 refers to the correction level value stored in the correction level value storage 1027 to calculate a value by subtracting the correction level value from 255 for each color component, and stores the values into the tentative correction amount storage 1031 as tentative correction amounts (Rct, Gct, Bct) (step S23).

Then, the reference correction amount setting unit 1033 refers to the highlight pixel data storage 1019 and the complete highlight pixel data storage 1023 to judge whether or not the number (Ah) of complete highlight pixels/the number (Ph) of highlight pixels is larger than 0.8, that is, Ah/Ph>0.8 is satisfied (step S25). Though the numerical value used for this comparison is not limited to 0.8, this embodiment is made to judge that the possibility that an originally white object is included is sufficiently high, when Ah/Ph>0.8 is satisfied.

When it is judged that Ah/Ph>0.8 is satisfied (step S25: Yes route), the reference correction amount setting unit 1033 sets the tentative correction amounts (Rct, Gct, Bct) stored in the tentative correction amount storage 1031 as the reference correction amounts (Rc, Gc, Bc), and stores the reference correction amounts into the reference correction amount storage 1035 (step S27). That is, the following equation (1) is identified for the calculation method of the reference correction amount, and the reference correction amounts are calculated according to the equation (1). Then, the processing is shifted to the processing of the step S35 described later.

$$Rc=Rct, Gc=Gct, Bc=Bct \tag{1}$$

On the other hand, when it is judged that Ah/Ph>0.8 is not satisfied (step S25: No route), the reference correction amount setting unit 1033 judges whether Ah/Ph<0.3 is satisfied or not (step S29). Though the numerical value used for this comparison is not limited to 0.3, in this embodiment, it is made to judge that the possibility that an originally white object is included is sufficiently low, when Ah/Ph<0.3 is satisfied.

When it is judged that Ah/Ph<0.3 is satisfied (step S29: Yes route), the reference correction amount setting unit 1033 sets 0 to Rc, Gc, and Bc as the reference correction amounts to prevent the correction, and stores the Rc, Gc, and Bc into the reference correction amount storage 1035 (step S31). That is, the following equation (2) is identified for the calculation method of the reference correction amount, and the reference correction amount is calculated according to the equation (2). Then, the processing shifts to the processing of the step S35 described later.

$$Rc=0, Gc=0, Bc=0 \tag{2}$$

Meanwhile, when it is judged that Ah/Ph<0.3 is not satisfied (step S29: No route), the reference correction amount setting unit 1033 identifies the following equation (3) for the calculation method of the reference correction amounts, calculates the reference correction amounts (Rc, Gc, Bc) according to the equation (3) by using the tentative correction amounts (Rct, Gct, Bct) stored in the tentative correction amount storage 1031, and stores the Rc, Gc, and Bc into the reference correction amount storage 1035 (step S33). That is, the tentative correction amounts are decreased to obtain the reference correction amounts.

$$Rc=Rct*(Ah/Ph-0.3)/0.5$$

$$Gc=Gct*(Ah/Ph-0.3)/0.5$$

$$Bc=Bct*(Ah/Ph-0.3)/0.5 \tag{3}$$

Then, the correction processor 1037 carries out the correction processing according to the following equation (4) for the image data stored in the image data storage 1003 by using the reference correction amounts (Rc, Gc, Bc) stored in the reference correction amount storage 1035, and stores the corrected image data into the corrected image data storage 1039 (step S35).

$$Ro=min(255, Ri*255/(255-Rc))$$

$$Go=min(255, Gi*255/(255-Gc))$$

$$Bo=min(255, Bi*255/(255-Bc)) \tag{4}$$

In the aforementioned equation (4), a suffix "i" means an input and a suffix "o" means an output, and Ri represents an input pixel level of the R component, Ro represents an output pixel level of the R component, for example. Moreover, the equation (function) of min (X, Y) outputs the smaller one among X and Y. Incidentally, when one of the reference correction amounts (Rc, Gc, Bc) is set to 0, the pixel level for that color component does not change before and after the correction, because the output pixel level equal to the input pixel level is calculated for that color component. Thus, the correction for that color component is not carried out. When the image correction processing is completed, the color balance correction apparatus 1000 ends the processing.

Figure 6:
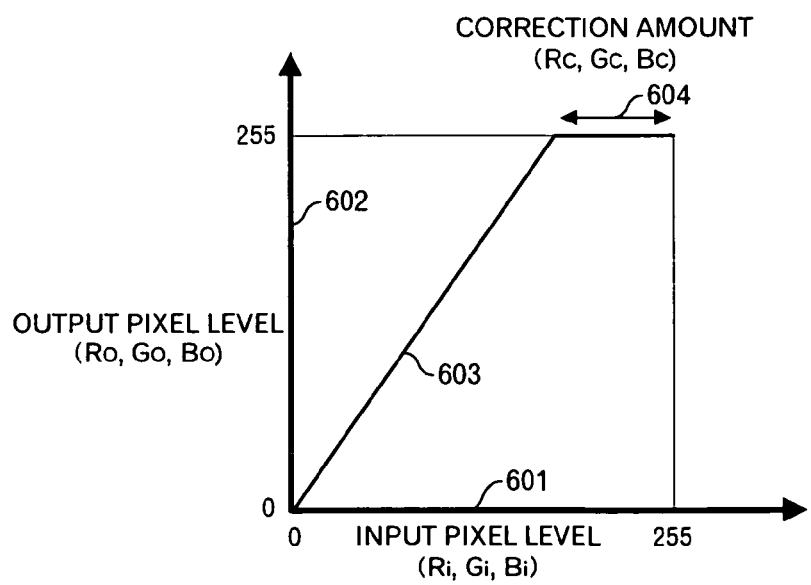
FIG. 6 is a conceptual diagram of an equation used for a correction processing.

FIG. 6 shows a conceptual diagram of the aforementioned equation (4). FIG. 6 shows an axis 601 corresponding to the input pixel level, an axis 602 corresponding to the output pixel level, an output pixel level setting line 603, a segment 604 corresponding to the reference correction amount. Incidentally, the conceptual diagram shown in FIG. 6 represents a state not for all color components, but for one color component.

The output pixel level setting line 603 represents that the output pixel level increases linearly when the input pixel level increases, until the input pixel level reaches to a value obtained by subtracting the reference correction amount from 255. Specifically, it follows the inclination of 255/(255—reference correction amount) One value of Rc, Gc and Bc, for example, is substituted for this reference correction amount. Then, the output pixel level is fixed to 255, when the input pixel level becomes equal to or greater than the value obtained by subtracting the reference correction amount from 255.

For example, when the reference correction amount Rc of the R component is 51 and the pixel level Ri (the input pixel level) of the R component in a specific pixel is 100, the output pixel level Ro is 125 (=100*(255/(255−51))). Moreover, for example, when the reference correction amount Rc of the R component is 55 and the pixel level Ri (the input pixel level) of the R component in a specific pixel is 210, the output pixel level is 255, because 210 of the input pixel level exceeds 200 (=255−55) that is a value obtained by subtracting the reference correction amount from 255. The expression (function) to obtain such input and output results is the aforementioned equation (4).

As describe above, the image correction processing is carried out. As a result, it becomes possible that an appropriate correction is carried out or a wrong correction is not carried out even for an image having no white region.

Incidentally, the predetermined pixel ratio such 0.2 percent was used to calculate the correction level value in the aforementioned explanation (FIG. 5: step S21). However, this pixel ratio may be set according to the possibility that an originally white object is included. For example, when the number (Ah) of complete highlight pixels/the number (Ph) of highlight pixels is 0.8 or more, 0.2 percent is just set for the pixel ratio, and when Ah/Ph is 0.3 or less, 0 percent is set for the pixel ratio, and when Ah/Ph is greater than 0.3 and less than 0.8, the pixel ratio is defined linearly like (pixel ratio (percent)=0.2*(Ah/Ph−0.3)/0.5). In such a case, it is possible to set the tentative correction amount calculated in the step S23 (FIG. 5) to the reference correction amount as it is, without carrying out the decreasing processing after the tentative correction amount is calculated (FIG. 5: step S23 to step S33). This is because the tentative correction amount becomes smaller, when the pixel ratio becomes smaller.

Moreover, the histogram data used in the step S23 (FIG. 5) may be histogram data as to the complete highlight pixels. In such a case, the histogram generator 1009 generates the histogram data for the complete highlight pixels.

Figure 7:
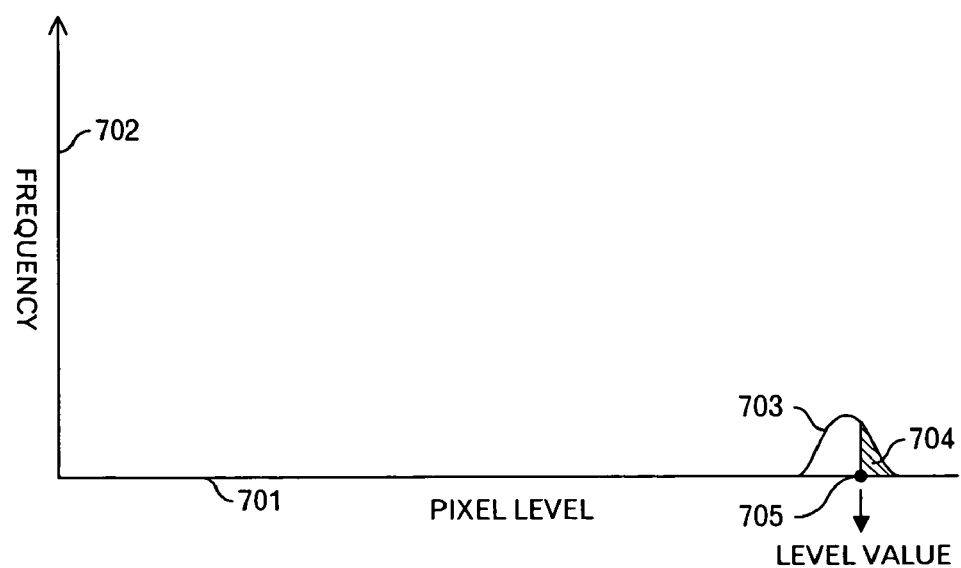
FIG. 7 is a conceptual diagram to explain a level value setting of the second case.

FIG. 7 shows a conceptual diagram of the level value setting using the histogram data of the complete highlight pixels. FIG. 7 shows an axis 701 corresponding to the pixel level, an axis 702 corresponding to the frequency, a frequency curve 703, a reference level region 704, and a point 705 to indicate the set level value. Incidentally, the pixel level value grows from left to right of the diagram, for example.

Though the elements in the diagram and the procedure to identify the level value are similar to FIG. 4, the number of pixels composing the histogram in the example shown in FIG. 7 is smaller than FIG. 4, because the pixels to be processed is limited to the complete highlight pixel. Therefore, in this case, the number of pixels to be multiplied with the pixel ratio (for example, 0.2 percent) is not the number (Ah) of complete highlight pixels composing the histogram, but the number of all pixels included in the image or the number of pixels (pixels whose gradation level has not been overflowed) identified in the step S3 (FIG. 3) is used. Incidentally, when the number (Ah) of complete highlight pixels composing the histogram is smaller than a value calculated by multiplying the number of all pixels included in the image by 0.2 and the level value cannot be identified, the correction may not be carried out.

Although the embodiment of this invention is described above, this invention is not limited thereto. For example, the functional block configuration shown in FIG. 2 is a mere example, and it may differ from an actual program module construction. Moreover, conceptual diagrams shown in FIG. 1A, FIG. 1B, FIG. 1C, FIG. 4, FIG. 6 and FIG. 7, and image examples shown in FIG. 8A and FIG. 8B are mere examples, and similar data might be expressed by another mode. Furthermore, the processing flows shown in FIGS. 3 and 5 are also mere examples, and as far as similar processing results are obtained, the processing order may be replaced, and any step may be executed at the same time and may be added or deleted if necessary.

Moreover, an apparatus that carries out the aforementioned processing may be a general computer with a memory and a processor, and may be a digital camera or other image processing apparatus having a processor.

What is claimed is:

1. An image correction method, comprising:
   identifying first pixels that satisfy one of predetermined conditions as to a pixel level, which are set for each color component, among pixels included in a specific image;
   identifying second pixels that satisfy a plurality of said predetermined conditions as to said pixel level, which are set for each said color component, among said pixels included in said specific image;
   calculating an evaluation value relating to a duplication degree between said first pixels and said second pixels; and
   correcting said specific image based on said evaluation value.

2. The image correction method as set forth in claim 1, wherein said correcting comprises calculating a correction amount based on said evaluation value.

3. The image correction method as set forth in claim 1, further comprising:
   generating histogram data of said pixel levels for each said color component for said specific image; and identifying a first pixel level that cumulative frequency from a highest pixel level becomes a predetermined ratio for a number of pixels to be processed in said specific image, for each said color component, by using said histogram data, and wherein said predetermined condition is a condition that said pixel included in said specific image has one of pixel levels included between the identified first pixel level and a limit level of said color component.

4. The image correction method as set forth in claim 2, further comprising:

generating histogram data of said pixel levels for each said color component in said specific image; and identifying a second pixel level that cumulative frequency from a highest pixel level becomes a predetermined ratio for a number of pixels to be processed in said specific image, for each said color component, by using said histogram data, and said calculating said correction amount comprises:

calculating a tentative correction amount for each said color component based on a difference between said second pixel level and a limit level of said color component; and changing said tentative correction amount based on said evaluation value.

5. The image correction method as set forth in claim 2, wherein said calculating said correction amount comprises:

setting a third ratio based on said evaluation value;

generating histogram data of said pixel levels for each said color component for said specific image;

identifying a third pixel level that cumulative frequency from a highest pixel level becomes said third ratio for a number of pixels to be processed in said specific image, for each said color component, by using said histogram data; and determining a correction amount based on a difference between said third pixel level and a limit level of said color component.

6. The image correction method as set forth in claim 1, wherein said correcting comprises:

identifying a calculation method of a reference correction amount according to said evaluation value;

calculating said reference correction amount according to the identified calculation method; and correcting said specific image by using said reference correction amount.

7. The image correction method as set forth in claim 1, further comprising:

identifying pixels whose pixel level of one color component is a limit level among said pixels included in said specific image, and wherein said identifying said first pixels and said identifying said second pixels are carried out for pixels other than said pixels whose pixel level of one color component is said limit level.

8. The image correction method as set forth in claim 1, wherein said identifying said second pixels comprises identifying pixels that satisfies all of said predetermined conditions as to said pixel level, which are set for each said color component, among said pixels included in said specific image.

9. The image correction method as set forth in claim 2, further comprising:

generating histogram data of said pixel levels for each said color component for said second pixels;

identifying a fourth pixel level that cumulative frequency from a limit level of said color component becomes a predetermined ratio for a number of pixels to be processed in said specific image, for each said color component, by using said histogram data, and wherein said calculating said correction amount comprises:

calculating a tentative correction amount for each said color component based on a difference between said fourth pixel level and a limit level of said color component; and changing said tentative correction amount based on said evaluation value.

10. The image correction method as set forth in claim 1, wherein said evaluation value is a ratio of a number of first pixels and a number of second pixels.

11. A storage medium storing an image correction program, for causing a computer to execute an image correction, said image correction program comprising:

identifying first pixels that satisfy one of predetermined conditions as to a pixel level, which are set for each color component, among pixels included in a specific image;

identifying second pixels that satisfy a plurality of said predetermined conditions as to said pixel level, which are set for each said color component, among said pixels included in said specific image;

calculating an evaluation value relating to a duplication degree of said first pixels and said second pixels; and correcting said specific image based on said evaluation value.

12. An image correction apparatus, comprising:

a first pixel identifying unit that identifies first pixels that satisfy one of predetermined conditions as to a pixel level, which are set for each color component, among pixels included in a specific image;

a second pixel identifying unit that identifies second pixels that satisfy a plurality of said predetermined conditions as to said pixel level, which are set for each said color component, among said pixels included in said specific image;

a calculation unit that calculates an evaluation value relating to a duplication degree of said first pixels and said second pixels; and a correction unit that corrects said specific image based on said evaluation value.

13. An image correction apparatus, comprising:

means for identifying first pixels satisfying one of predetermined conditions as to a pixel level, which are set for each color component, among pixels included in a specific image;

means for identifying second pixels that satisfy a plurality of said predetermined conditions as to said pixel level, which are set for each said color component, among said pixels included in said specific image;

means for calculating an evaluation value relating to a duplication degree of said first pixels and said second pixels; and means for correcting said specific image based on said evaluation value.

* * * * *

UNITED STATES PATENT AND TRADEMARK OFFICE
CERTIFICATE OF CORRECTION

| | | |
|---|---|---|
| PATENT NO. | : 7,359,100 B2 | Page 1 of 1 |
| APPLICATION NO. | : 11/372389 | |
| DATED | : April 15, 2008 | |
| INVENTOR(S) | : Masayoshi Shimizu | |

It is certified that error appears in the above-identified patent and that said Letters Patent is hereby corrected as shown below:

Col. 14, line 57, delete "of" and insert --between--, therefor.

Signed and Sealed this

Fifth Day of August, 2008

JON W. DUDAS
*Director of the United States Patent and Trademark Office*